(12) United States Patent
Torres

(10) Patent No.: US 10,575,497 B2
(45) Date of Patent: *Mar. 3, 2020

(54) PROGRAMMABLE TRAINING SYSTEM FOR PETS

(71) Applicant: Terry Lee Torres, Neptune, NJ (US)

(72) Inventor: Terry Lee Torres, Neptune, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/389,130

(22) Filed: Apr. 19, 2019

(65) Prior Publication Data

US 2019/0239480 A1 Aug. 8, 2019

Related U.S. Application Data

(63) Continuation of application No. 15/374,131, filed on Dec. 9, 2016, now Pat. No. 10,306,870.

(60) Provisional application No. 62/347,593, filed on Jun. 8, 2016.

(51) Int. Cl.

| | |
|---|---|
| *A01K 15/02* | (2006.01) |
| *H04R 1/02* | (2006.01) |
| *G06F 3/16* | (2006.01) |
| *H04W 4/021* | (2018.01) |
| *H04W 4/80* | (2018.01) |

(52) U.S. Cl.
CPC .......... *A01K 15/021* (2013.01); *H04R 1/028* (2013.01); *H04W 4/021* (2013.01); *H04R 2420/07* (2013.01); *H04W 4/80* (2018.02)

(58) Field of Classification Search
CPC .. A01K 15/021; H04R 1/028; H04R 2420/07; H04W 4/021; H04W 4/80

USPC .......................................... 119/719
See application file for complete search history.

(56) References Cited

U.S. PATENT DOCUMENTS

| | | | | |
|---|---|---|---|---|
| 5,307,763 | A * | 5/1994 | Arthur ................. | A01K 15/023 119/718 |
| 7,770,541 | B2 * | 8/2010 | Boyd ..................... | A01K 29/00 119/719 |
| 8,839,744 | B1 * | 9/2014 | Bianchi ................ | A01K 15/021 119/720 |
| 2002/0189551 | A1 * | 12/2002 | Patterson ............. | A01K 15/021 119/719 |
| 2006/0219187 | A1 * | 10/2006 | Krishnamurthy .... | A01K 5/0275 119/719 |
| 2012/0137987 | A1 * | 6/2012 | Moulin ................ | A01K 15/023 119/719 |
| 2013/0169441 | A1 * | 7/2013 | Wilson ................. | A01M 29/10 340/573.3 |

(Continued)

*Primary Examiner* — Joshua E Rodden
(74) *Attorney, Agent, or Firm* — Wei & Sleman LLP

(57) ABSTRACT

A method for training an animal includes the steps of recording, by a user, of a plurality of audio messages encouraging or commanding the animal to engage in, refrain from engaging in or cease engaging in a plurality of user-determined behaviors, storing the plurality of audio messages in a memory of a collar module to be worn by the animal, audibly broadcasting a user-selected audio message simultaneously with the user physically controlling the animal to engage in, refrain from engaging in or ceasing from engaging in the activity referenced by the user-selected audio message, sensing a location of the animal with a location detector, and triggering an audio broadcast from the collar module of a user-selected message particular to the behavior associated with the device and heard by the animal based on the location.

19 Claims, 7 Drawing Sheets

(56) References Cited

U.S. PATENT DOCUMENTS

| | | | | |
|---|---|---|---|---|
| 2013/0220235 A1* | 8/2013 | Wisdom | ............... | A01K 15/02 |
| | | | | 119/719 |
| 2015/0107531 A1* | 4/2015 | Golden | ............... | A01K 15/023 |
| | | | | 119/719 |
| 2016/0015004 A1* | 1/2016 | Bonge, Jr. | ........... | A01K 27/009 |
| | | | | 119/718 |

* cited by examiner

PROGRAMMABLE TRAINING SYSTEM FOR PETS

CROSS-REFERENCES TO RELATED APPLICATIONS

This application is a continuation of U.S. patent application Ser. No. 15/374,131, filed Dec. 9, 2016, and claims priority to U.S. Provisional Patent Application No. 62/347,593, filed on Jun. 8, 2016, the contents of both are hereby incorporated by reference in their entirety as if fully set forth herein.

BACKGROUND OF THE INVENTION

Field of the Invention

The invention is a training device and method for utilizing it that can be used to help train a pet regardless of the particular behavior being taught or reinforced. It assists the user in training a pet to: (a) engage in positive behaviors; (b) cease engaging in negative behaviors; (c) calm frightened behaviors; or (d) learn various service animal skills. Training a pet can be an imposing task and responsibility. Users cannot always consistently correct the pet's misbehavior on the spot. This training inconsistency often affects the length of time it takes the pet to learn. Consistency is one of the key elements in having a pet learn behavioral conditioning quickly and effectively. Further compounding the problem is the fact that the pet's trainer cannot be with the pets all the time. When no one is around, the pets may deviate from the expected behavior without on the spot consequences.

Additionally, pets may experience anxiety when left alone or during stressful times such as thunderstorms or nearby loud construction work. These types of stress may manifest themselves in the pet whining by the front door, barking incessantly, wrecking furniture, chewing shoes, tearing up carpets etc. Users are not always available to be home with the pet to soothe and comfort it during these times to stop these bad behaviors. Further, homes that have more than one pet may have the need to keep the pet's food separate. Especially if one has a special diet or requires medication. If the user is not home, ensuring that pet A stays away from pet B's food or food bowl is impossible.

In addition, it is often hard to read the wants or needs of most pets. Some dogs having to urinate are brought to a physical point of pain before they give an outward sign of whining before we know of their need. Some hungry dogs are brought to a point of licking their empty bowl before we realize the need. In the context of the limitations of our pet's daily services, a dog's bark cannot communicate to their owner whether a mailman, stranger, family or friend has arrived on the property. Seizure alert service dogs are of limited assistance if their patient/owner isn't paying attention when they are trying to alert them of a pending seizure event. Likewise, many other service dogs are limited in their ability to communicate with their owners.

Description of the Prior Art

Historically, pet training involved the direct, one-on-one interaction of trainer with the pet. Reinforcement of positive behaviors by the pet was rewarded typically by an edible treat. Negative behaviors were "punished" with a loud voice (e.g. "NO") or disagreeable noise (e.g. the rattling of coins in an empty can). Decades ago electrical devices began to be used with the invention of "shock collars" that triggered an electrical shock to the pet when it attempted to cross predetermined boundaries. There is no suggestion in the prior art of any programmable device using the owner's or trainer's own voice to teach both positive behaviors and the avoidance of negative behaviors without the physical presence of the user of the device. In addition, there is no suggestion in the prior art of a programmable two-way communication system using the owner's or trainer's own voice, that the owner can customize to their specific needs, circumstances and/or desires. This two-way communication system also includes the ability for trained service pets to initiate remote third-party notification of medical alert conditions via internet access.

BRIEF SUMMARY OF THE INVENTION

The invention described herein encompasses both physical devices and a method for utilizing them that is the first automated pet training system using audio commands in the user's own voice that continues to work enforcing and reinforcing a pet's behavioral conditioning 24-hours a day, even during periods of the user's physical absence. The invention, in one embodiment, comprises three distinct electronic modules: (1) A Collar Module worn affixed to the pet; (2) a Command Module held by the user; and, (3) one or more Proximity Signaling Modules placed by the user in locations appropriate to the pet's training locations. The invention offers accelerated learning by providing a higher level of training consistency than any user and/or handler can possibly achieve on their own. The invention in this embodiment interacts with the pet automatically using recorded audio messages in the user's own voice that are stored in the Collar Module's memory. Individual messages are selectively played back by one of two ways: (1) they can be triggered manually by the Command Module during the actual training of the pet; and/or, (2) they can be remotely triggered automatically by the proximity of the pet to a Proximity Signaling Module that is physically positioned at a location where a particular behavior requires modification.

Another embodiment of the invention deals with the phenomena associated with pet anxiety resulting from being left home alone. Often pets suffering from anxiety may exhibit behaviors such as waiting by the door or window or causing damage within the home. In these instances the invention helps ease the stress that the pet experiences. By using the same process described above, users may record friendly or soothing messages to be played when the pet is found to be spending too much time at the front door, window, by the owner's slippers etc., thereby helping to reduce stress and anxiety.

In another embodiment, the invention allows the pet to be trained to communicate with his/her owner/caregiver by the purposeful triggering of the message playback system in response to the pets wants or needs, environmental based changes (e.g. alert to arrival of mail man or other) and/or the medical alert need of the owner/user.

DETAILED DESCRIPTION OF THE INVENTION

Figure 1:
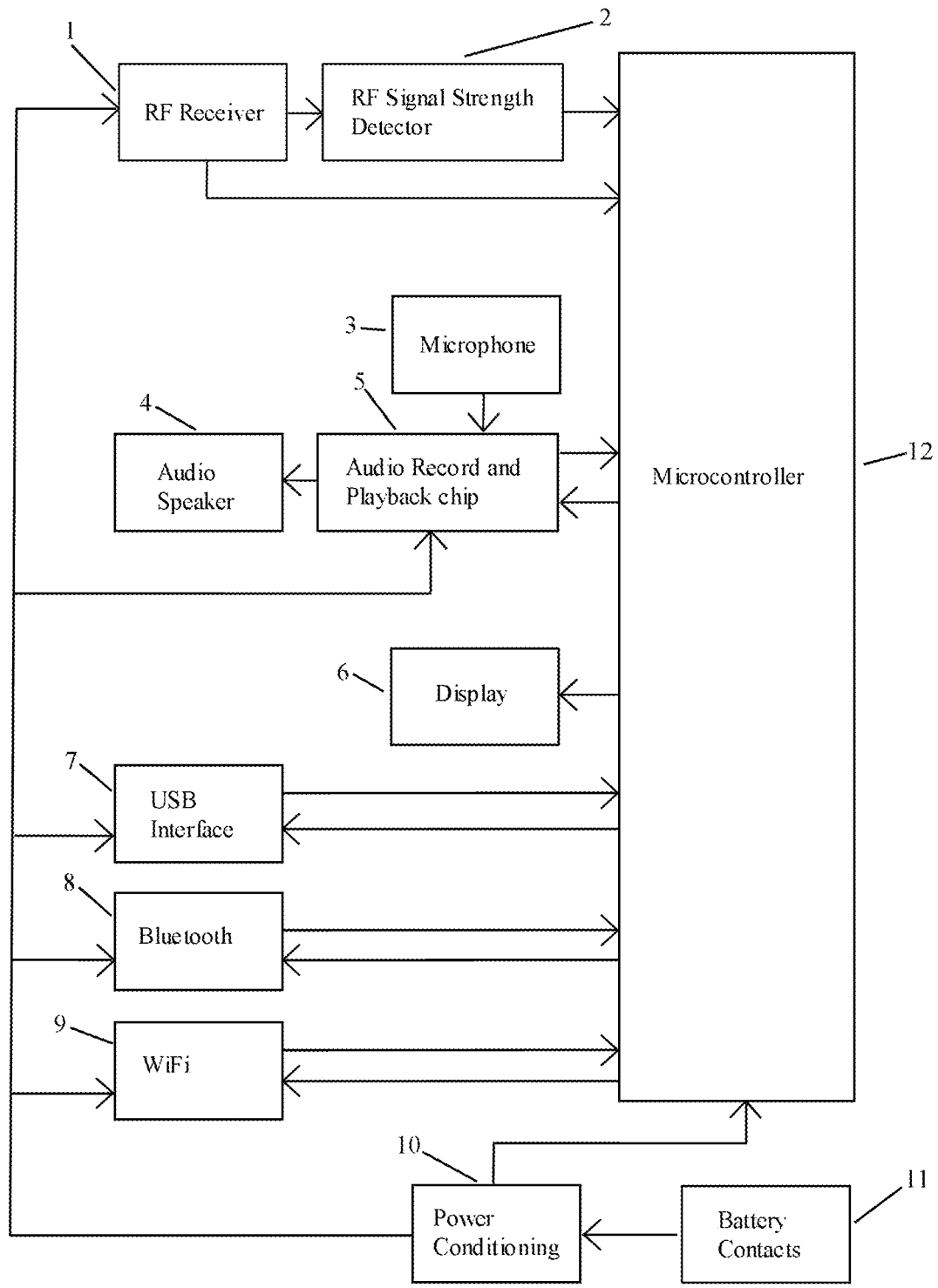
FIG. 1 is a block diagram of the invention's Collar Module in its preferred embodiment using a radio frequency transmission for communications and for proximity detection. It is used to store and playback audio files created by the user by using the Command Module and autonomously by the use of Proximity Signaling Modules.

How the Invention is Used:

The invention is a pet training and automated behavioral conditioning and reinforcement system. The system works by Pavlov's theory of classical conditioning. The invention utilizes verbal cues and commands that the pet subsequently associates with specific desired behaviors.

Using the Command Module, multiple independent short audio files are recorded in the Collar Module, by the user in his or her own voice. In the invention's first mode of operation, these audio message files are triggered by the user and audibly played back over the Collar Module during the pet's training phase. The pet will eventually learn to associate each individual recorded message with a particular desired behavior.

After the first phase of the pet's training is complete, the system may be used in its second mode of operation so that the learned behavior is consistently and automatically reinforced without the user's direct intervention. Proximity Signaling Modules remotely trigger the playback of individual audio messages stored in the Collar Module when the Collar Module comes within 2 to 4 feet of the Proximity Signaling Module. The user may physically position one or more of the system's Proximity Signaling Modules at one or more locations where it is desired to modify or reinforce the pet's behavior. The user "programs" the Proximity Signaling Module(s) using dip switches thereon to activate the audio playback of a specific recorded message associated with a particular pet behavior that occurs at a particular location. The appropriate audio message file is then automatically played back over the Collar Module's speaker when the Collar Module is in proximity to a particular Proximity Signaling Module. After a brief pause the message will be repeated until the pet physically moves out of the immediate vicinity of the particular Proximity Signaling Module.

For example, in the invention's first mode of operation, if the pet is not allowed on the couch, the user would record a message admonishing the pet for this behavior. The user would then use the Command Module to trigger the playback of the admonishing message while physically removing the pet from the couch. The user would repeat this playback and removal process as many times as required. Eventually the pet will learn to associate the audible message with the desired behavior of getting off the couch without the owner needing to physically remove the pet.

At this time the user will activate the invention's second mode of operation by activating a Proximity Signaling Module and placing it under the cushion of the couch. Now, when and only when the pet jumps on the couch, the Collar Module detects its proximity to the Proximity Signaling Module and automatically triggers the playback of the appropriate admonishing message. The pet hears the message and jumps off the couch. The invention allows the recording and playback of multiple individual messages associated with multiple individual Proximity Signaling Modules. Each individual message is triggered by its own discrete Proximity Signaling Module.

In the invention's Talk to me mode of operation a user teaches a pet how to communicate back to the user using only the Collar Module and the Proximity Signaling Module components of the present invention. For example, to teach a pet to communicate the need to be taken for a walk or to be let out of a dwelling the user would:

(1) Record a message such as, "Please take me for a walk, I've got to go!";

(2) set and place a Proximity Signaling Module at any desired location (in this case by the front door).

(3) subsequently, when the user notices the pet wanting to go out, the user would work with the pet and cause him to physically approach and wait by the location of the Proximity Signaling Module (front door).

This will cause the Collar Module to begin its playback of the desired message and keep repeating this specific message as long as he remains within 2 to 4 feet. When the pet hears the message playback 3 or 4 times the user should thereafter take the pet out for a walk. Over time the pet will learn to associate this action and the playback of this particular message with the expectation of being taken for a walk. To encourage this type of learning the user may reward the dog with a treat for the eventual successful execution of this new learned behavior. Further, utilizing the same training approach described above in the talk to me mode of operation, a seizure service dog can be taught to trigger a specific Proximity Signaling Module (that are placed at specific locations within a dwelling or office) that causes an audio alert to sound out loud, from his collar, in response to a pending critical seizure event. In addition, a user's pet can be taught to communicate a variety of environmental and/or medical events to the user using the same training method.

The invention may optionally include a computer controlled interface utilizing a USB connection allowing access to a number of notification features incorporated in the present invention. Using the USB interface a user may access Behavior Logs (described later in this specification) and a menu that allows the user to enable or disable specific alert notification types.

In context of the use of the Bluetooth applications, an application ("app") is installed on the user's smartphone. The smartphone app would find and pair the user's smartphone with the invention's Collar Module. The stated app would allow a local smartphone to send and receive pre-written alert notifications, in the form of text messages, to other remote smartphone users over the user's existing mobile network, based upon the user's menu selection of the available notification services accessed through USB or Bluetooth means. Ideally, the smartphone app would ask for a list of telephone numbers to transmit prewritten text messages. Then it would provide a number of fields for the user to write custom messages that will be transmitted automatically when a particular collar message is tripped. Lastly, it would provide a table which the device would utilize to determine when a particular custom message is to be sent to a specific telephone number(s) in response to a specified collar message being triggered. In the alternative, the user may elect to disable any part of or all alert notifications. This would allow some collar audio message playbacks to cause a cellular text message to be transmitted by the user's cell phone, while inhibiting cellular text messages from being transmitted when other collar audio messages are tripped and played. Likewise, all cellular text messages may be inhibited.

Similarly, the user may activate the invention's WiFi connection by supplying the available WiFi's username and password credentials through USB or Bluetooth means. Whereby, when the user's proper WiFi credentials are submitted, the present invention would: (1) activate the unit's WiFi Module; (2) establish a connection with the user's internet router; (3) connect to a online website and initiate identification protocols. Once logged in the user would have access to the same Behavior Logs and menu available to the Bluetooth application described above with the addition of an expanded menu of features encompassing alert notification through email, automated telephone call and web to mobile phone communications.

How the Invention Works:

Referring to FIG. 1, the RF Receiver 1 is a 433 MHz super regenerative module such as Linx Technologies part number RXM-433-LR. This RF receiver 1 detects any present RF signal while supplying an analog output voltage that is proportional to the device's input signal strength. Because this module has an RSSI (Received Signal Strength Indicator) output it can both serve as a communication link and a proximity detection device.

The RF Signal Strength Detector 2 is a Schmidt trigger comparator designed to trip its output when the RF Receiver's 1 RSSI output voltage exceeds a predetermined threshold. This device serves as a proximity determinant mechanism by disabling the Microcontroller 12 from decoding RF signals having too weak a signal strength.

The microphone 3 converts sound waves into electrical signals. The analog output from the microphone 3 is fed directly into the input of the Audio Record and Playback Chip 5.

The Audio Speaker 4 converts analog electrical waves into audible sound waves. The Audio Speaker 4 is coupled to the analog output stage of the Audio Record and Playback Chip 5.

The Audio Record and Playback chip 5 performs the recording and playback of audio signals. In the invention's preferred embodiment, it is a component such as Nuvoton part number ISD17120SY. This particular chip can provide up to 120 seconds of record time and also allows for full microcontroller control of all record and playback features including random audio file access capabilities. It should be noted that various manufacturers of audio record and playback chips have varying record time lengths. In addition, although the invention uses a single chip audio and playback solution in this embodiment, it is also possible to use microcontrollers equipped with analog to digital converters to store sampled audio signals directly to external memory and play them back from external memory using a Digital to Analog Converter to drive a loud speaker. The use of other configurations and components would be obvious to one of ordinary skill in the electronic arts.

The Display 6 in this embodiment consists of two LEDs. In this configuration the two LEDs represent the current status of the active record cycle and the collar module's low battery indicator status. It should be noted that while the invention in its preferred embodiment uses two LEDs to represent the Display 6 means, more complex display means such as Liquid Crystal Display may be used to provide a host of additional pet and user information. Their incorporation would be simple to one of ordinary skill in the electronic arts.

The USB interface 7 in the preferred embodiment is a single chip such as a Microchip PIC16F1455 microcontroller. This chip allows for the upload to a personal computer or computing device of hour by hour log events that detail a pet's behavior as indicated by the triggering of the Collar Module by the various Proximity Signaling Modules representing separate and distinct behavioral infractions as defined by the user. By accessing these logs with a personal computer the user would be able to view detailed logs about which Proximity Signaling Modules were tripped, when they were tripped and how frequently particular Proximity Signaling Modules were tripped on an hour by hour daily basis. This information would help the user understand which disciplines require further training and/or attention.

The Bluetooth Interface 8 in the preferred embodiment is a 2.4G Hz Bluetooth transceiver module, such as the SparkFun WRL-12577 B1. This module has transmit and receive functionality and would allow a "smart" phone with an appropriate application to perform the same functions as the invention's Command Module.

The WiFi Interface 9 is a wireless transceiver module such as an Esp8266 Serial Wifi. This module allows internet access and contains its own TCP/IP ready firmware. This WiFi Interface technology can interact with website scripts allowing information to be sent and/or received to remote servers. In this way this technology can be used to provide alert notification to any desired party by any and all means available to internet applications.

The Power Conditioning 10 module provides power to all of the other separate elements comprised within FIG. 1.

The Battery Contacts 11 represent the contacts of two AAA batteries configured in series. While the preferred embodiment of the invention uses two AAA batteries, any number of batteries may be used in association with a proper Power Conditioning system 10.

The Microcontroller 12 organizes, controls and executes preprogrammed instructions stored in internal memory. In the preferred embodiment, the Microcontroller 12 is a Microchip PIC 16F87. The Microcontroller 12 continuously scans the RF Receiver 1 input for a valid transmission contingent upon the state of the RF Signal Strength Detector 2. When the Microcontroller 12 receives a valid transmission, it will execute the corresponding instruction received. These instructions may include the playback, record, volume up or volume down commands acknowledged by the Audio Record Playback Chip 5. Further, the Microcontroller 12 may activate the unit's optional Bluetooth Interface 8 or WiFI interface 9 to access/or activate external peripherals and/or remote appliances.

Figure 2:
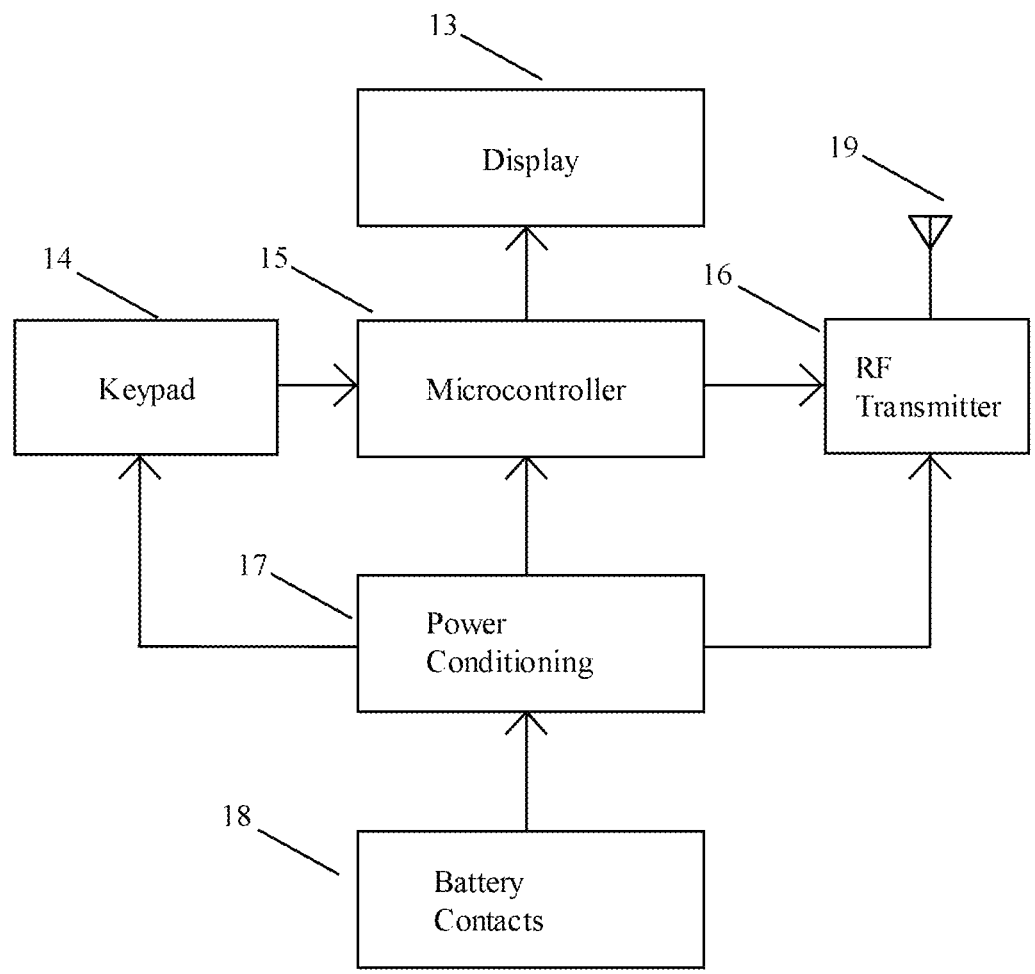
FIG. 2 is a block diagram of the invention's Command Module in its preferred embodiment using radio frequency communication protocols. The Command Module is used to initiate the recording or trigger the playback of audio recordings stored in the invention's Collar Module.

FIG. 2 is block diagram of the invention's Command Module assembly in its preferred embodiment utilizing a radio frequency configuration.

The Keypad 14 in this embodiment consists of 3 individual buttons: (1) a play button; (2) a record button and (3) a forward button. However it should be noted that more complex key pads including greater functionality and scope may be used. For example, a key pad consisting of Braille keys would allow a blind user to communicate with his pet, for example service dog, by pressing the buttons in the same fashion as a sighted person.

The RF Transmitter 16 is a 433 MHz Surface Acoustic Wave (SAW) based Carrier-Present Carrier-Absent (CPCA) transmitter capable of sending serial data at up to 5,000 bps. In the preferred embodiment this transmitter is a Linx Technologies part number TXM-433-LC. Other components of similar capabilities may also be used.

The Display 13 used in this embodiment is a 7-segment digital display such as KingBright type: SCO3-12EWA. This display apprises the user of the specific audio file that is ready to be manipulated or controlled. It can represent any alphanumeric character between 0-9. However, in this simplified example the numbers 1-7 are all that are needed to represent 7 individual audio files used in the invention's preferred embodiment. It would be obvious to one of ordinary skill in the electronic arts that components with the capability of storing additional audio files could be used and the Display 13 could be constructed in two segments to display numbers from 00 up to 99.

The Microcontroller 15, in the preferred embodiment a Microchip PIC16F87, reads the Keypad key presses and encodes the RF Transmitter 16 with a unique binary sequence of 1 s and 0 s representative of the specific command to be transmitted. The Microcontroller 15 continuously reads the Keypad 14 and enters a low power sleep mode if no key is pressed within 60 seconds.

The Power Conditioning 17 module provides power to all of the other separate elements comprised within FIG. 2.

The Battery Contacts 18 contains two AA batteries configured in series. Please note that in while the preferred embodiment uses two AA batteries configured in series, other numbers or types of batteries may be used in association with a proper configured Power Conditioning module 17.

Element 19 is the unit's tuned antenna such as Linx Technologies Inc. 433 MHz Chip RF Antenna 429 MHz-437 MHz-6.4 dBi Solder Surface Mount type: Ant-433-SP.

Figure 3:
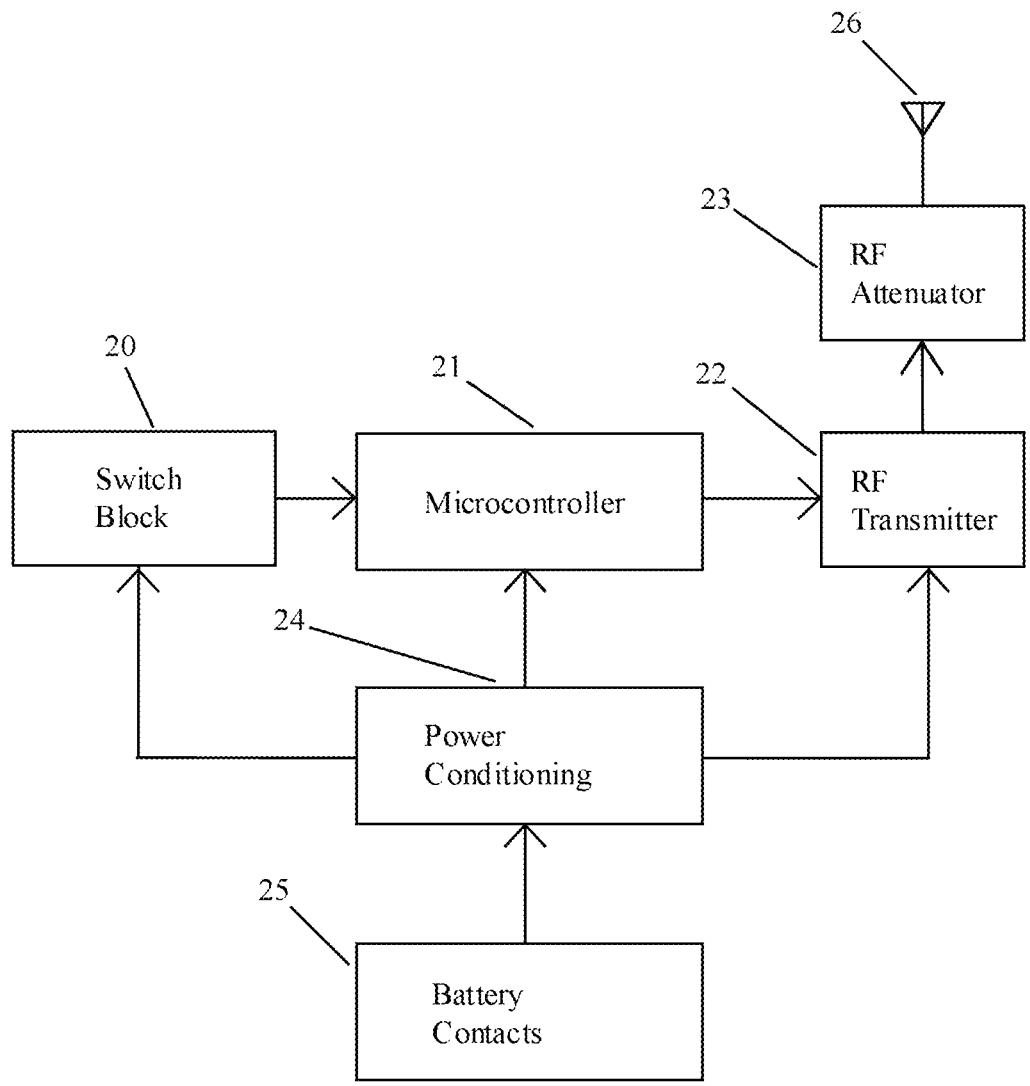
FIG. 3 is a block diagram of the invention's Proximity Signaling Module in its preferred embodiment utilizing radio frequency communication protocols.

FIG. 3 is a block diagram of the invention's Proximity Signaling Module in its preferred embodiment utilizing a radio frequency configuration. These Proximity Signaling Modules are deployed by the user to trigger the automatic playback of any recorded message stored within the Collar Module. The Switch Block is a 3-position surface mount dip switch bank such as a CTS Electrocomponents part number 219-3LPST. This series of dip switches allows any individual message to be selected by the positions the switches are toggled into. It should be noted that a larger number of messages may be addressed by adding additional switch positions.

The Microcontroller 21, such as Microchip's PIC12F683, continuously reads the state of the Switch Block 20 and encodes the RF Transmitter 22 with a unique binary sequence of 1s and Os representative of the unique message to be played by the Collar Module shown in FIG. 1. This process of reading the Switch Block 20 and encoding the RF Transmitter 22 happens repeatedly in a never ending cycle. To conserve power the Microcontroller 21 completes a single cycle once every 10-15 seconds.

The RF Attenuator 23 attenuates the output power from the RF Transmitter 22. The attenuation of the output power limits the range of the propagated electromagnetic wave and aids in the formation of the proximity detection mechanism described herein. In the preferred embodiment a detection distance of 2 to 4 feet is preset. Other attenuator designs could be used to limit the output power or provide power output adjustment.

The RF Transmitter 22 is a 433 MHz Surface Acoustic Wave (SAW) based Carrier-Present Carrier-Absent (CPCA) transmitter capable of sending serial data at up to 5,000 bps. In the preferred embodiment this transmitter is a Linx Technologies part number TXM-433-LC. Other similar devices may be used.

The Power Conditioning 24 module provides power to all of the other separate elements comprised within FIG. 3.

The Battery Contacts 25 contains two AA batteries configured in series. Please note that in while the preferred embodiment uses two AA batteries configured in series, other numbers or types of batteries may be used in association with a proper configured Power Conditioning module 24.

Element 26 is the unit's tuned antenna such as Linx Technologies Inc. 433 MHz Chip RF Antenna 429 MHz-437 MHz-6.4 dBi Solder Surface Mount type: Ant-433-SP.

Figure 4:
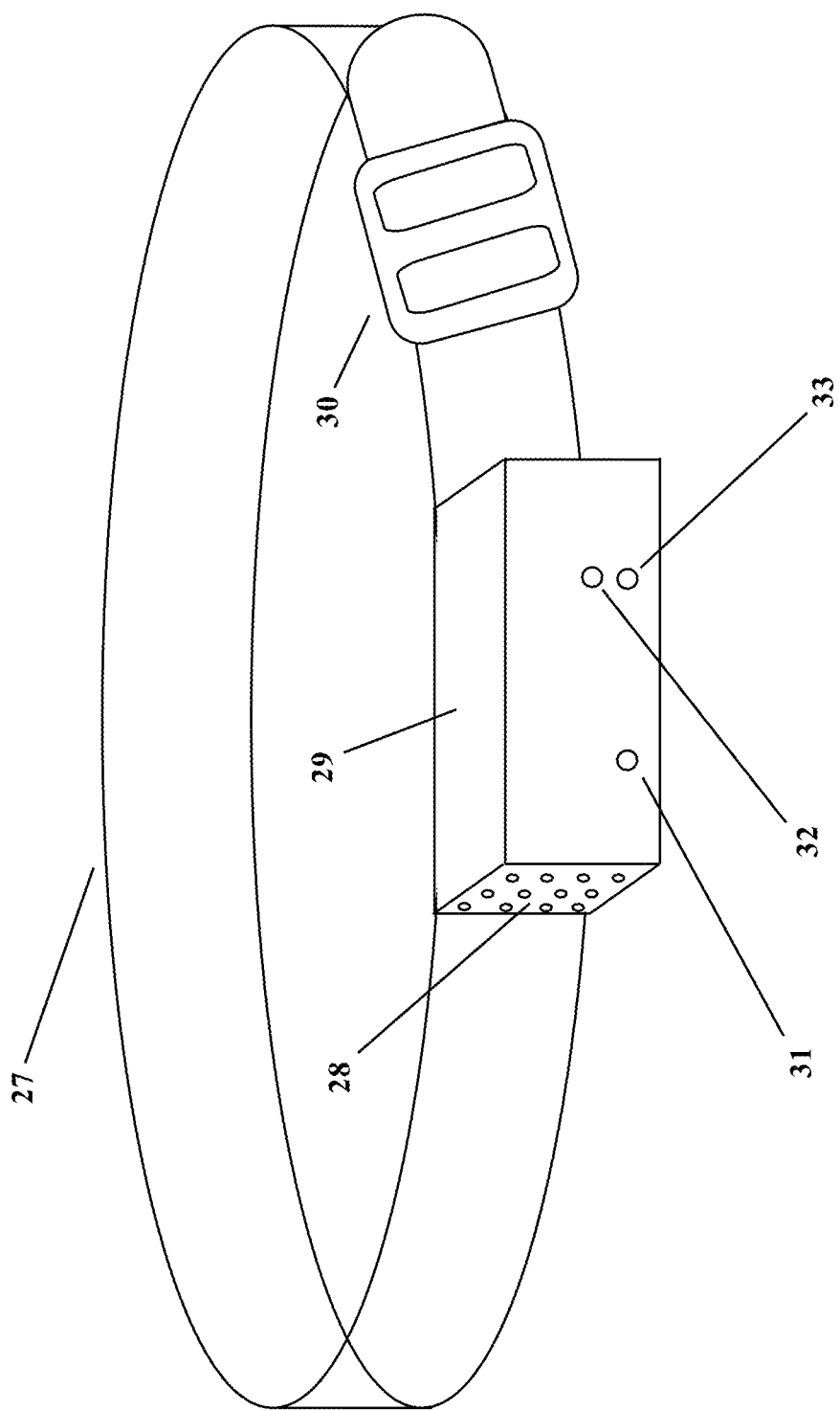
FIG. 4 is a drawing of the invention's Collar Module in its preferred embodiment showing the outer shell of the Collar Module attached to a generic pet collar.

FIG. 4 is a simplified drawing of the invention's Collar Module in its outer shell encasing the entire Collar Module FIG. 1 as attached to a generic pet collar. In this drawing the adjustable Collar 27 may be made from nylon, leather or any other appropriate material and is shown affixed to the outer shell of the Collar Module 29. The Adjustment Clasp 30 allows for the adjustment of the Collar 27 length. The perforated side panel 28 permits the interior mounted 20 mm round Audio Speaker 4 shown in FIG. 1 to emit audio sound outside the enclosure with sufficient volume to be heard 10-20 feet away. The low voltage warning lamp 31 is a red LED and the "Now Recording" indicator lamp 32 is a green LED. Together they form the Display 6 shown in FIG. 1. The green LED 32 illuminates to inform the user of when the recording period has begun and extinguishes when the recording period has ended. The red LED 31 illuminates when battery power becomes too low and requires replacement batteries. A microphone perforation 33 is aligned with an internally mounted Microphone 3 as shown in FIG. 1. The Collar Module outer shell 29 contains all the components illustrated in FIG. 1 including the batteries that power them.

Figure 5:
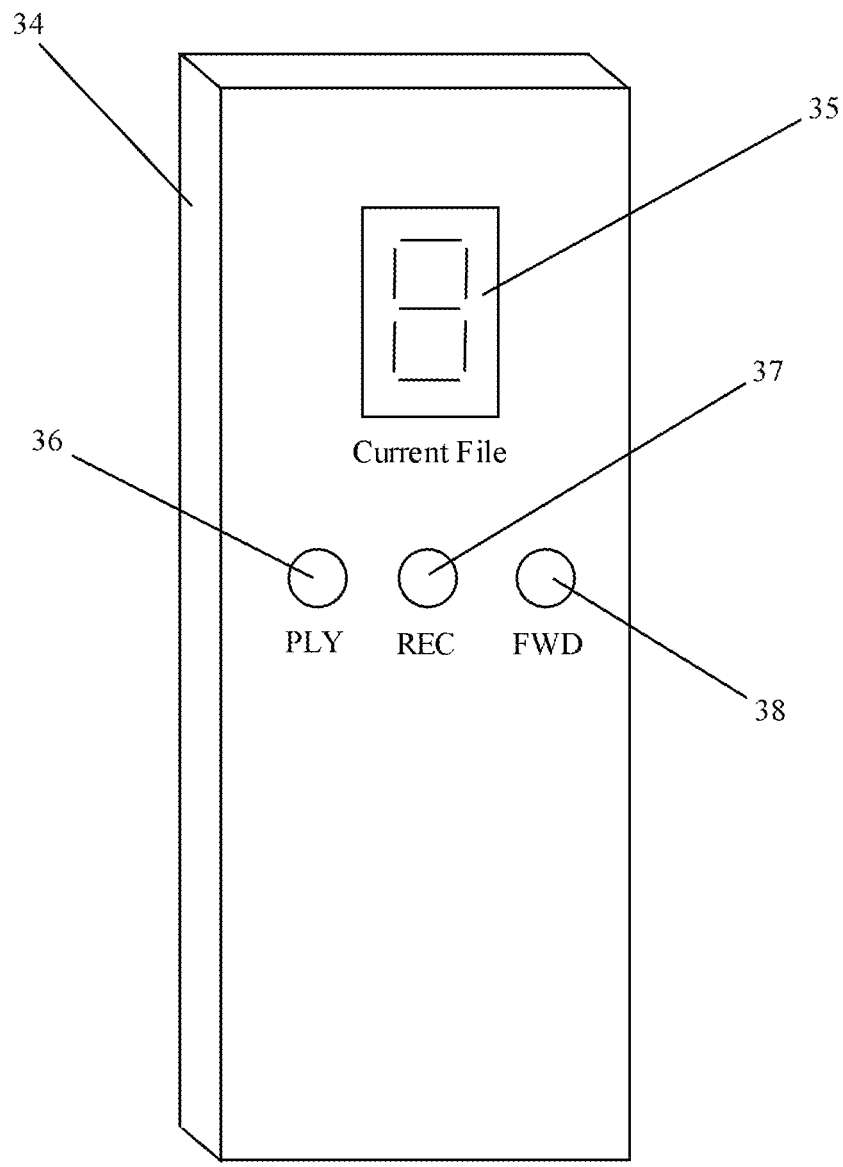
FIG. 5 is a drawing of the invention's Command Module outer shell in its preferred radio frequency embodiment.

FIG. 5 is a simplified drawing of the invention's Command Module in its outer shell. The outer shell 34 protects the internal circuitry shown in FIG. 2 from damage caused by accidental shock or impact. The Current File Display element 35 cycles through the numbers of the available audio file locations and is the external view of element 13 shown in FIG. 2. The FWD button 38 allows a user to cycle through the available audio file locations 1 through 7 in an incremental fashion. It should be noted that because of the simplicity of this technology and the small number of audio file locations, a rewind or back button is not implemented although it may find use in other applications. To select an audio file the user presses the FWD button 38 until that audio file number remains illuminated. At that time the user may manipulate that audio file by pressing the PLY button 36 or the REC button 37. The PLY button 36 will cause a playback of the selected audio file number, while the REC button 37 will initiate a record cycle beginning at the audio file location shown on the Current File Display 35. The buttons PLY 36, REC 37 and FWD 38 form the keypad structure shown as element 14 in FIG. 2.

Figure 6:
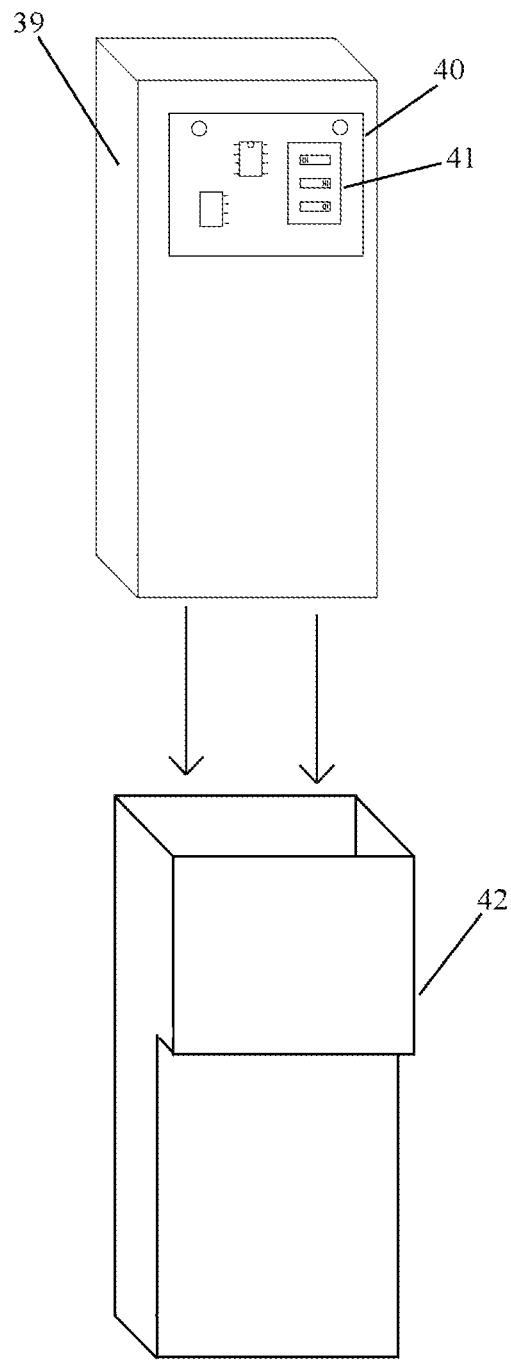
FIG. 6 is a drawing of the invention's Proximity Signaling Module outer shell in its preferred embodiment utilizing a radio frequency configuration.

FIG. 6 is a drawing of the upper and lower outer shells of the invention's Proximity Signaling Module (FIG. 3) utilizing a radio frequency configuration. After the Proximity Signaling Module has been programmed using the Dipswitches 41, the upper part of the shell 39 slides into the lower part 42.

Element 39 contains the device's batteries as well as the circuit board 40 shown schematically in FIG. 3.

Figure 7A:
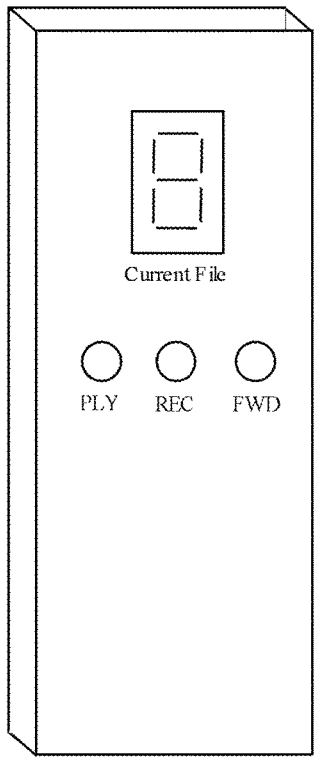
FIGS. 7a, 7b and 7c are drawings of the invention's Command Module, Proximity Signaling Module and Collar Module assemblies respectively.
Figure 7B:
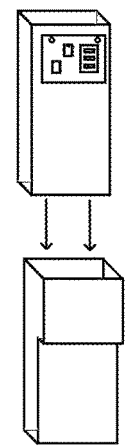
Figure 7C:
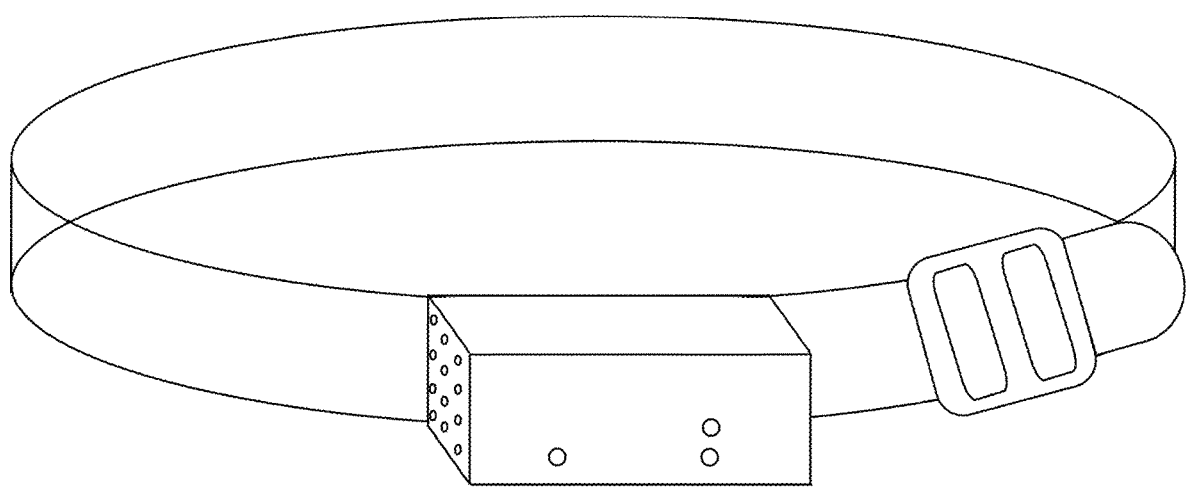

FIGS. 7a, 7b and 7c are drawings of the invention's Command Module, Proximity Signaling Module and Collar Module assemblies respectively. No scale.

Further, the present invention can also be used in a "talk to me" mode of operation. In this mode of operation, the system would allow the user to train their pet to purposely trigger audio playback of specific messages intended for the user's edification and/or notification. In this mode of operation the pet is taught how to communicate with his/her owner through the use of the present invention. For example, a user may teach their pet to communicate their desire to eat by placing a Proximity Signaling Module (FIGS. 3 and 6) next to the pet's food bowl and recording a message that says "I'm hungry, please feed me." Now when the pet goes to their empty food bowl the Collar Module (FIGS. 1 and 4) will play the specified message with sufficient volume to be heard throughout the home. Likewise, a Proximity Signaling Module may be placed by the front/rear door and a message is recorded that says "I want to go out. Please walk me." Now when the pet goes to the front/rear door and stays there longer than a predefined period of time the Collar Module will again play the specified message with sufficient volume to be heard throughout the home.

This process can also be used to inform the owner of events around the home or business. For example, the pet may be taught to go to a particular window when the mailman arrives. In context of service dogs, the pet may be taught to go to a particular location when a person or party enters onto the property. In the case of seizure alert dogs and other types of medical alert dogs, an audio message may be triggered by the dog in order to forewarn their owner of impending crisis situations.

In all of the above scenarios, this ability of this invention to allow for two way communication is further enhanced by the invention's ability to connect to a cell phone notification application through the Bluetooth module 8 shown in FIG. 1.

In addition, in the case of service dogs, internet based transmissions of critical crisis situations can use the WiFi link 9 shown in FIG. 1 allowing for global notification of secondary response personnel, e.g. neighbor, doctor, family member etc.

In another embodiment the invention may be implemented using infrared transmitting/receiving and proximity based detection methods in the Command Module, Collar Module and Proximity Signaling Module assemblies rather than the RF communication methods used in the preferred embodiment. In yet another embodiment, a GPS receiver may be added to the Command Module to set problem behavior locations and initiate automatic message playback over longer distances such as in setting outdoor perimeter boundaries.

Either of the two alternative embodiments described above may easily be implemented by one of ordinary skill in the electronic arts without changing the intent or scope of the invention.

What is claimed is:

1. A method for training an animal comprising the steps of:
   recording, by a user, of a plurality of audio messages encouraging or commanding the animal to engage in, refrain from engaging in or cease engaging in a plurality of user-determined behaviors;
   storing the plurality of audio messages in a memory of a collar module to be worn by the animal;
   audibly broadcasting a user-selected audio message simultaneously with the user physically controlling the animal to engage in, refrain from engaging in or ceasing from engaging in an activity referenced by the user-selected audio message;
   sensing a location of the animal with a location detector; and
   triggering an audio broadcast from the collar module of a user-selected message particular to the behavior associated with the collar module and heard by the animal based on the location;
   wherein the location detector comprises a GPS receiver in the collar module, and wherein sensing a location of the animal comprises sensing the location of the animal with the GPS receiver in the collar module.

2. The method of claim 1, further comprising the step of providing a command module in communication with the collar module.

3. The method of claim 2, wherein the step of audibly broadcasting a user-selected audio message simultaneously with the user physically controlling the animal includes using the command module to trigger audible broadcasting.

4. The method of claim 1, wherein sensing a location of the animal comprises using at least one of radiofrequency, Bluetooth or the GPS receiver to sense the location.

5. The method of claim 1, wherein recording, by a user, of a plurality of audio messages includes recording a plurality of audio messages in the user's own voice.

6. The method of claim 1, further comprising the step of storing information on the collar module related to certain behaviors of the animal.

7. The method of claim 6, wherein storing information on the collar module comprises logging of the frequency the animal's presence at the location.

8. The method of claim 6, wherein storing information on the collar module comprises information on when the location detector was sensed.

9. The method of claim 6, further comprising the step of transferring the information from the collar module to a computer or mobile device.

10. A method for training an animal comprising the steps of:
    recording, by a user, of a plurality of audio messages encouraging or commanding the animal to engage in, refrain from engaging in or cease engaging in a plurality of user-determined behaviors;
    storing the plurality of audio messages in a memory of a collar module to be worn by the animal;
    audibly broadcasting a user-selected audio message simultaneously with the user physically controlling the animal to engage in, refrain from engaging in or ceasing from engaging in an activity referenced by the user-selected audio message;
    sensing a location of the animal with a location detector; and
    triggering an audio broadcast from the collar module of a user-selected message particular to the behavior associated with the collar module based and heard by the animal based on the location,
    wherein the location detector comprises at least one proximity signaling device, and wherein sensing a location comprises physically placing the at least one proximity signaling device at one location where the user-determined behaviors are likely to be engaged by the animal when the user in not physically present, and wherein triggering an audio broadcast comprises broadcasting the user-selected message based on the collar module's presence near the at least one proximity signaling device.

11. The method of claim 10, wherein physically placing at least one proximity signaling device at a location includes physically placing a plurality of proximity signaling devices, each of the plurality of proximity signaling devices being placed at a different location.

12. The method of claim 11, wherein each of the plurality of proximity signaling devices is associated with at least one audio broadcast.

13. The method of claim 10, further comprising the step of sending a message to the user in response to one of a plurality of user-specified events associated with one of the at least one proximity signaling device.

14. The method of claim 13, wherein sending a message to the user comprises sending a text message.

15. The method of claim 13, wherein sending a message to the user comprises sending an audible message.

16. The method of claim 13, wherein sending a message to the user comprises broadcasting a message from the collar module to alert the user.

17. The method of claim 13, wherein sending a message to the user comprises broadcasting a message from the collar module to alert the user of a seizure event.

18. The method of claim 10, wherein physically placing the at least one proximity signaling device includes placing at least one anxiety-related proximity signaling device at a location known to be frequented by the animal when the animal experiences anxiety.

19. The method of claim 18, wherein triggering the audio broadcast from the collar module includes triggering a soothing message to the animal when the animal approaches the at least one anxiety-related proximity signaling device.

* * * * *